(12) United States Patent
Guck et al.

(10) Patent No.: US 6,230,201 B1
(45) Date of Patent: May 8, 2001

(54) CONFIGURABLE TRANSACTION ROUTING SYSTEM AND METHOD

(75) Inventors: Randal L. Guck, Dana Point; Donald E. Willis, Jr., Huntington Beach, both of CA (US)

(73) Assignee: IP Net Solutions, Inc., Newport Beach, CA (US)

(*) Notice: Subject to any disclaimer, the term of this patent is extended or adjusted under 35 U.S.C. 154(b) by 0 days.

(21) Appl. No.: 09/086,660

(22) Filed: May 29, 1998

(51) Int. Cl.[7] ........................................... G06F 15/16

(52) U.S. Cl. ..................... 709/228; 709/225; 709/227; 705/35; 705/37

(58) Field of Search ................... 709/201, 202, 709/203, 302, 226, 228, 225, 227; 705/35, 39, 42, 37, 26; 345/344

(56) References Cited

U.S. PATENT DOCUMENTS

| | | | |
|---|---|---|---|
| 5,513,126 | * 4/1996 | Harkins et al. | 709/228 |
| 5,710,889 | * 1/1998 | Clark et al. | 705/35 |
| 5,794,234 | * 8/1998 | Church et al. | 709/201 |
| 5,978,577 | * 11/1999 | Rierden et al. | 709/202 |
| 5,991,520 | * 11/1999 | Smyers et al. | 709/302 |

* cited by examiner

Primary Examiner—Dung C. Dinh
Assistant Examiner—Chuong Ho
(74) Attorney, Agent, or Firm—Lyon & Lyon LLP

(57) ABSTRACT

A system and method for managing electronic transactions between a host system and a plurality of trading partners. A transaction gateway is employed to manage electronic transactions between the host system and the trading partners in accordance with a set of rules defined within a software application. The transaction gateway may take the form of a network server, and the rules may provide a correlation between identified trading partners, transaction types, modes of communication and/or scheduling constraints.

16 Claims, 6 Drawing Sheets

CONFIGURABLE TRANSACTION ROUTING SYSTEM AND METHOD

BACKGROUND

The present invention relates generally to electronic commerce and, more particularly, to systems and methods for effecting commercial transactions via electronic interfaces. The present invention also relates to systems and methods for implementing an electronic transaction gateway between a host computer system and the computer systems of a plurality of trading partners.

Recently, substantial attention has been directed to the field of electronic commerce and, in particular, to systems and methods that utilize various aspects of the Internet for effecting commercial transactions and enabling communication between trading partners. Moreover, those skilled in the art will readily appreciate that many businesses are already communicating with each other via one of several electronic interfaces. Such interfaces include, for example, telephonic interfaces, facsimile (FAX) interfaces, value added network (VAN) interfaces, point-to-point dial-up interfaces and Internet interfaces. Those skilled in the art will also appreciate that numerous businesses have established systems for effecting electronic data interchange (EDI) transactions with their trading partners, and that several EDI standards have been developed in an effort provide standard message formats for effecting such business transactions. For example, EDI formats or "templates" are provided for purchase orders, invoices, shipping notices, product registrations and so on. Presently, two principal EDI standards, X12 and EDIFACT, are utilized for effecting and managing electronic commerce. The X12 standard is managed by the ANSI ASC X12 committee and is the predominant standard used by businesses and governmental agencies in North America, whereas the EDIFACT standard is managed by the United Nations ECE working group, and is the prevailing standard used within Europe and Asia.

In view of the foregoing, it becomes readily apparent that when a given business determines to engage in electronic commerce or, perhaps more importantly, decides to migrate from one form of electronic commerce to another, numerous issues must be addressed. The issues are further complicated when it is taken into consideration that not all trading partners will prefer to utilize or, indeed, support the same electronic interfaces or modes of communication, and that not all trading partners will support the same data formats. As noted above, companies in Europe and Asia may prefer to exchange data in accordance with the EDIFACT standard, whereas companies within the United States may prefer to exchange data in accordance with the X12 standard.

Thus, those skilled in the art will appreciate that a need exists for systems and methods that will enable businesses to manage sophisticated, heterogeneous trading partner networks involving diverse protocols, transaction types, scheduling and translation requirements.

SUMMARY OF THE INVENTION

The present invention is directed to systems and methods for enabling businesses to manage a sophisticated, heterogeneous network of trading partners, and to systems and methods for implementing an electronic transaction gateway between a host system and the computer systems of a plurality of trading partners.

In one innovative aspect, the present invention is directed to a computer based electronic transactions gateway that controls how a host system interacts with the computer systems of a plurality of trading partners. Moreover, in one preferred form, a computer based electronic transactions gateway in accordance with the present invention may comprise a central processing unit having a link to a host system and links to a plurality of electronic data interface networks, such that the central processing unit may establish communications between the host system and selected ones of the electronic data interface networks to effect transactions between the host system and a plurality of trading partner systems. In such an embodiment, a computer program, which is executed by the central processing unit, may comprise a hierarchical set of rules that define how the host system may interact with the plurality of trading partner systems. The rules may define, for example, what electronic data interface networks are to be used with specific trading partners and/or what networks are to be used for specific types of transactions. The rules may also define scheduling parameters that are applicable to certain transactions.

In another innovative aspect, the present invention is directed to the implementation of a network server that may manage a flow of electronic transactions between a host system and the systems of a plurality of trading partners. Such a server may include, for example, a central processing unit (CPU) card, a host network interface card electronically coupled to the CPU card, and an external network interface card electronically coupled to the CPU card. A software application running on the CPU of the CPU card defines how the host system may interact with the plurality of trading partner systems. In a preferred embodiment, the software application may also enable the utilization of a graphic user interface for establishing and modifying rules to be followed in conducting transactions generally, in conducting transactions with specific trading partners and/or in conducting transactions of particular types. The rules may also define how specific transactions with specific trading partners are to be handled.

In still another innovative aspect, the present invention is directed to a method of managing electronic transactions between a host system and a plurality of trading partner systems. In accordance with such a method, a hierarchical set of rules defining how the host system may interact with a plurality of trading partner systems is defined within a software application. The software application may then be configured on a network server, and the network server may be utilized to control a flow of transactions between the host system and the trading partner systems. In a preferred form, the set of rules may include host system default rules applicable to transactions of all types between the host system and all trading partners unless a more specific rule applies, host system transaction rules applicable to transactions of a specific type unless a more specific rule applies, trading partner default rules applicable to all transactions between the host system and a specific trading partner unless a more specific rule applies, and trading partner transaction rules applicable to specific trading partners and specific transactions.

Thus, it will be apparent to those skilled in the art that, when systems and methods in accordance with the present invention are utilized to control a flow of electronic transactions between a host system and the systems of a plurality of trading partners, numerous advantages are achieved.

For example, because a transaction gateway in accordance with the present invention may support any number of transaction protocols, such a gateway will enable businesses to support any existing electronic data interface (EDI) infrastructures and additional infrastructures including, for example, emerging internet commerce infrastructures from a single point of administration. Similarly, a transaction gateway in accordance with the present invention allows for a single transaction type or numerous transaction types exchanged with a given trading partner to be conducted via a different electronic data interface with minimal effort and with minimal inconvenience to persons responsible for those transactions.

Those skilled in the art will also appreciate that a transaction gateway in accordance with the present invention provides for maximum scalability. Moreover, in an environment where hundreds or thousands of trading partners are involved, most transactions will be effected in accordance with common routing and scheduling requirements, and exceptions will occur for specific trading partners and/or specific transaction types. Thus, by establishing a hierarchical structure for transaction processing rules, it is possible in accordance with a preferred form of the present invention to define general rules for the majority of transactions and specific rules to address the needs of specific trading partners and/or transaction types. For this reason, it is believed that very large trading partner environments may be managed with a relatively low number of processing rules.

Finally, those skilled in the art will appreciate that a transaction gateway in accordance with the present invention may provide a unique vehicle for handling scheduling issues. Moreover, because scheduling issues may be treated as an attribute of a rule within a transaction gateway in accordance with the present invention, scheduling requirements can be defined hierarchically. It follows that in accordance with one aspect of the present invention scheduling functions may be narrowly tailored to the requirements of each transaction type, each trading partner and/or each mode of communication or electronic data interface.

Accordingly, it is an object of the present invention to provide an improved system and method for managing electronic transactions between a host system and the systems of a plurality of trading partners.

DESCRIPTION OF PREFERRED EMBODIMENTS

Figure 1:
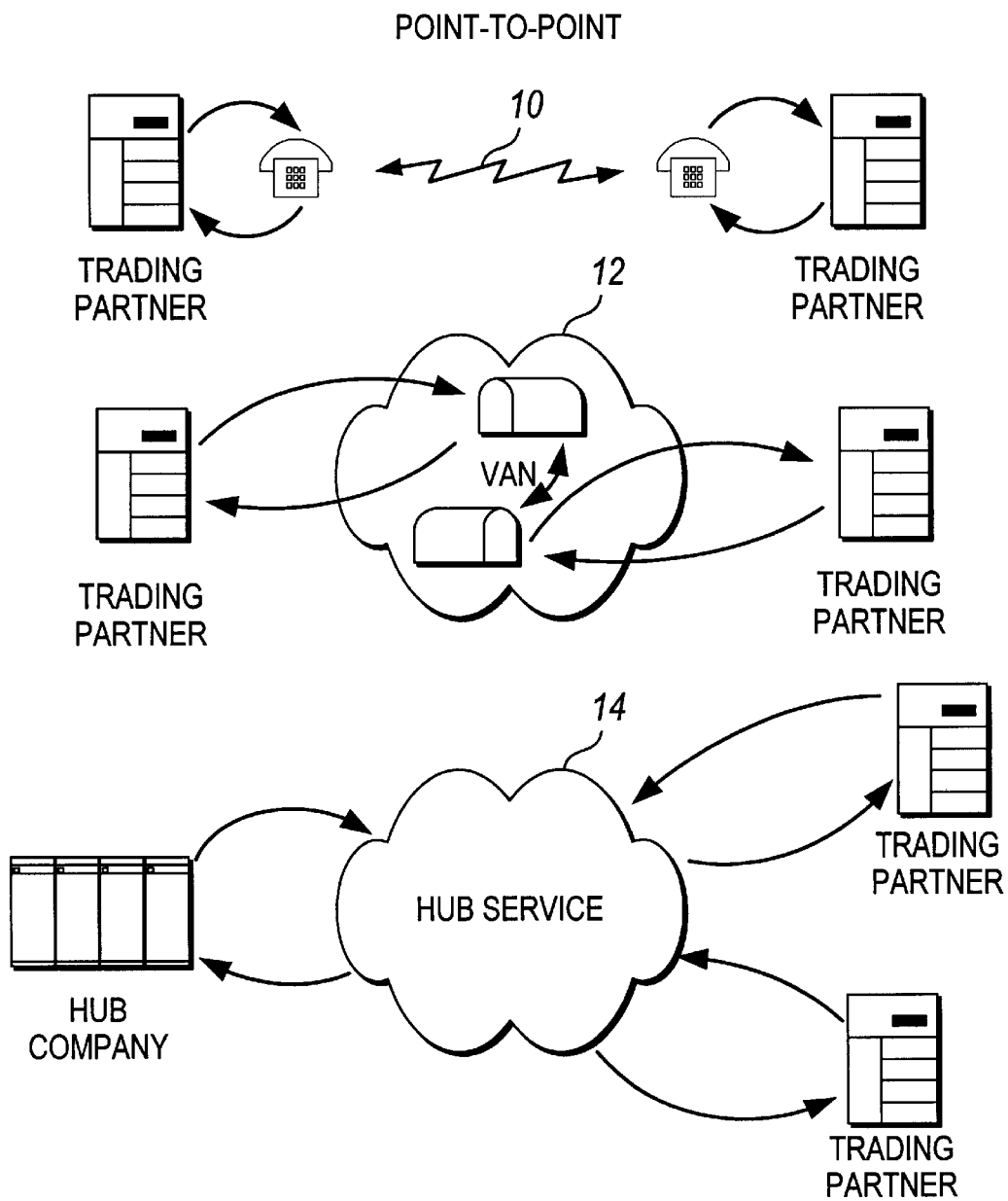
FIG. 1 is an illustration of several conventional electronic data interface (EDI) networks.

Turning now to the drawings, FIG. 1 provides an illustration of a plurality of conventional electronic data interface (EDI) networks that may be utilized by trading partners to conduct transactions. The term "transaction," as used herein, is meant to apply to both EDI and non-EDI transactions. For example, a transaction may comprise a true EDI transaction or a simple file or data transfer between trading partners. As shown in FIG. 1, some trading partners currently use point-to-point modems 10 to "dial-up" trading partners and send EDI transactions using, for example, a file transfer protocol. Other trading partners may use value added networks or VANs 12 to exchange EDI transactions. Value added networks offer private "mailbox" services with which companies can mail outbound EDI transactions to one or more trading partners and download inbound transactions to their host systems. Still other trading partners may utilize "hub" services 14 wherein it is possible to dial-up a central server and deposit or download EDI transactions. Finally, it will be appreciated that, with the growth of the internet, numerous trading partners are exchanging EDI transactions via various internet protocols (not shown), and that many companies utilize all or the majority of the above-described EDI networks to exchange transactions.

In view of the numerous EDI networks that are available for effecting electronic transactions, and in view of the numerous protocols and data formats that are employed in effecting electronic transactions, it is not surprising that the management of an evolving, heterogeneous trading partner network can become a difficult task.

Figure 2:
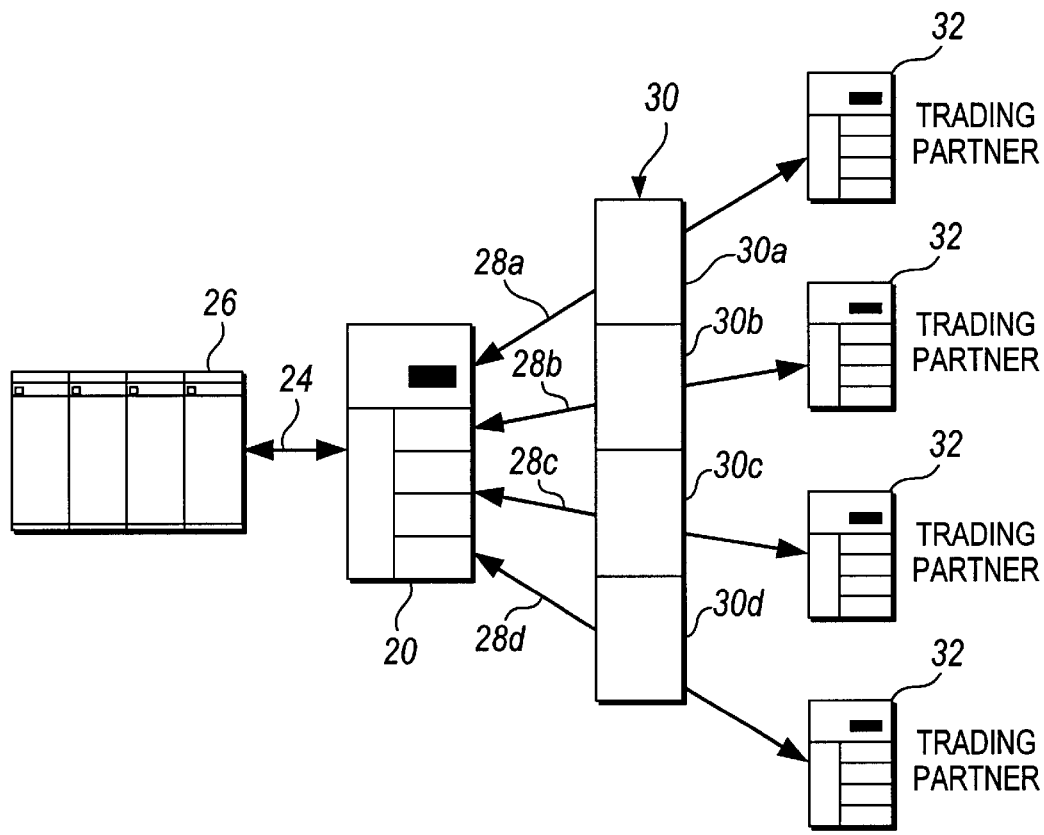
FIG. 2 is an illustration of a network server comprising a transaction gateway in accordance with one form of the present invention.

Turning now to FIG. 2, a server 20 comprising an electronic transaction gateway in accordance with the present invention may comprise a central processing unit 22 (shown in FIG. 5) having a link 24 to one or more processors comprising a host system 26 and a plurality of links 28a–d to a plurality of electronic data interface networks 30, such that the central processing unit 22 may establish communications between the host system 26 and selected ones of the electronic data interface networks 30 to effect transactions between the host system 26 and a plurality of trading partner systems 32. As explained above, the electronic data interface networks 30 may comprise, for example, a point-to-point network 30a, a value added network (VAN) 30b, a hub network 30c and an internet link 30d. A software program executed by the central processing unit 22 comprises a set of rules that define how the host system 26 may interact with the plurality of trading partner systems 32.

In one preferred embodiment, the rules that define how the host system 26 may interact with the plurality of trading partner systems 32 may have a hierarchical structure comprising, for example, four different levels of applicability, from the most generic to the most specific. Moreover, in a presently preferred form, a set of transaction processing rules may have the following hierarchical structure:

Host Company Default Rules that apply to transactions of all types sent to or received from all trading partners, unless a more specific rule applies;

Host Company Transaction Rules that apply to transactions of a specific type sent to or received from all trading partners unless a more specific rule applies;

Trading Partner Default Rules that apply to transactions of all types sent to or received from a specific trading partner, unless a more specific rule applies; and Trading Partner Transaction Rules that apply to a specific trading partner and a specific transaction type.

Figure 3:
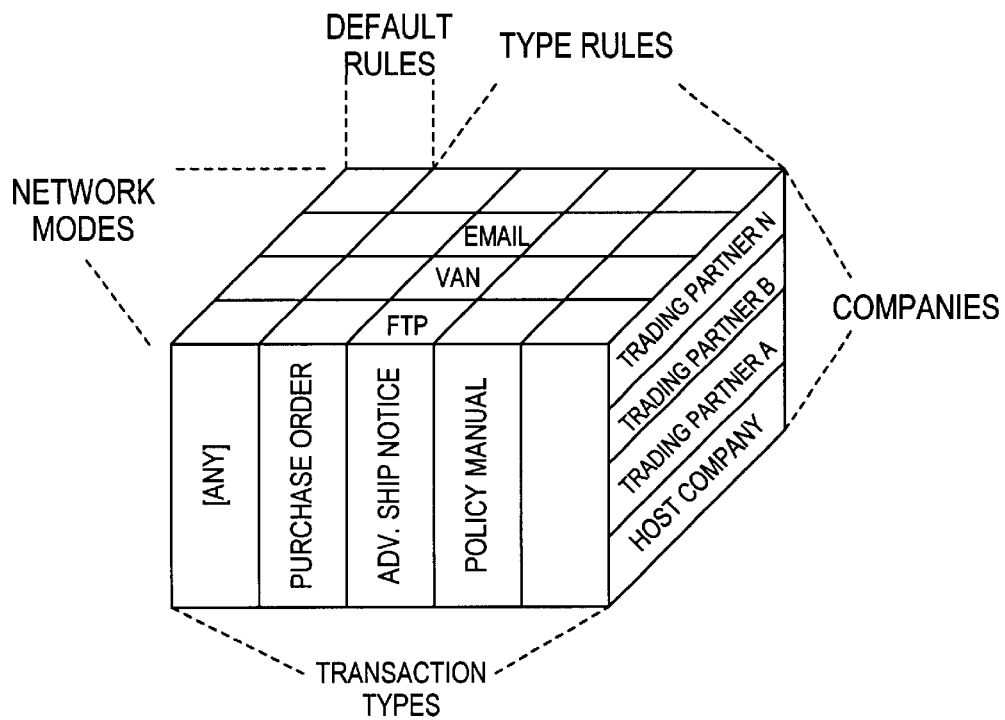
FIG. 3 is an illustration of a rule hierarchy that may be employed within a software application and/or transaction gateway in accordance with a preferred form of the present invention.

Thus, it will be appreciated that at whatever level a rule in accordance with the present invention is defined, the rule will generally be associated with a specific company. Similarly, each rule will generally affect either all transaction types or a specific transaction type. Thus, each rule may be viewed as providing a connectivity between companies and transaction types. In addition, each rule will generally specify an electronic data interface network or mode of communication to be utilized with a given transaction type. Those skilled in the art will, therefore, appreciate that a set of transaction processing rules in accordance with a preferred form of the present invention may be visualized as a three-dimensional table, such as that shown in FIG. 3, which provides a correlation between trading partner identities, transaction types, and communication modes or electronic data interface networks.

Figure 4:
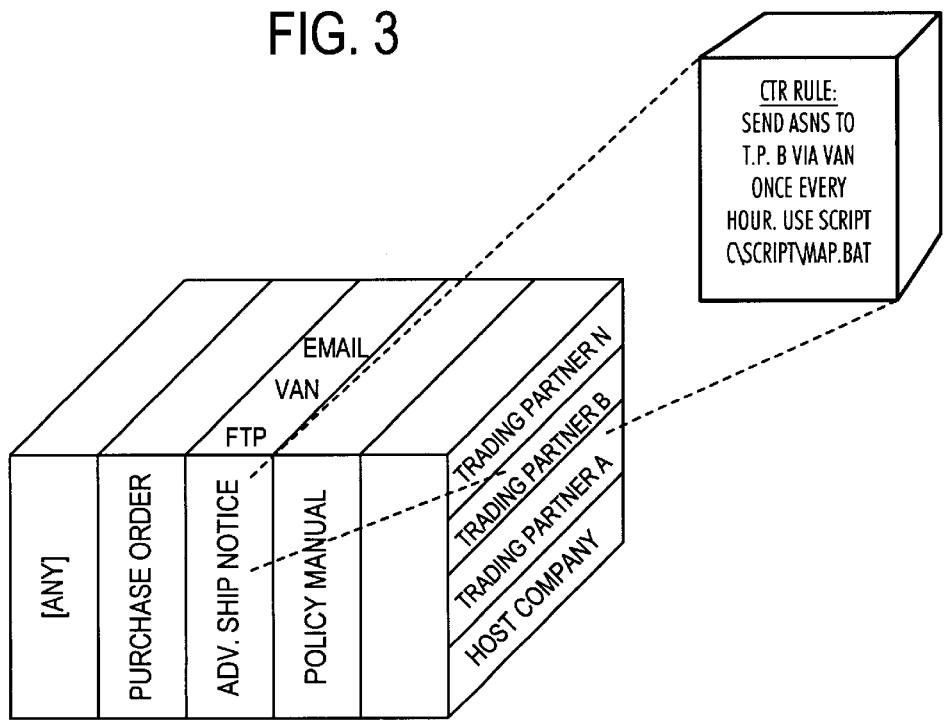
FIG. 4 is an illustration of a selected rule within a rule hierarchy that may be employed within a software application and/or transaction gateway in accordance with a preferred form of the present invention.

Turning now to FIG. 4, each transaction processing rule can be thought of as a "cell" within a three-dimensional table. In addition, each transaction processing rule may specify one or more "transaction attributes" that affect transactions of one or more specified types and/or affect transactions with one or more specified trading partners. In theory, any number of transaction attributes can be specified to affect the flow of transactions through an electronic transaction gateway in accordance with the present invention. However, the following attributes are currently being utilized within systems in accordance with the present invention:

Network Mode: A Transaction processing rule can define a specific network mode (e.g. FTP, VAN, Email, etc.), or it can "defer" the network mode to a more general rule. The network mode designates which network mode should be used to transmit the affected transaction types to the relevant trading partners.

Schedule: A schedule is a definition of when relevant transactions are to be transmitted. A schedule could indicate that transactions are to be sent immediately, once a day at a given time, periodically throughout the day, or based on some other criteria. In addition, the schedule attribute can be empty ("null"), causing it to be deferred to a more general rule.

Inbound Script: This attribute indicates that, for an affected inbound transaction, a script must be executed which will transform the transaction data in some manner. For example, an inbound script could be used to translate a formatted EDI transaction into a non-EDI data file, which is then uploaded to the host system. An inbound script attribute also can be specified as "none" to indicate that the transaction is to be transmitted to the host system as-is, or it can be empty ("null") to defer the inbound script value to a more general rule.

Outbound Script: An outbound script defines a script through which an affected transaction must pass before it is transmitted to the receiving trading partner. This allows, for example, an outbound non-EDI data file to be translated into a formatted EDI file before it is sent to a trading partner. An outbound script attribute also can be specified as "none" to indicate that the transaction is to be transmitted to the trading partner as-is, or it can be empty ("null") to defer the outbound script value to a more general rule.

An exemplary transaction processing rule is depicted in FIG. 4. This rule is specific to Trading Partner B and "advanced ship notice" (ASN) transactions. The rule defines three attributes: a network mode of "VAN", a schedule of "once an hour", and an outbound script name of "c:\script\map.bat". Consequently, the semantics of this rule are that outbound ASN transactions destined for Trading Partner B must be processed via the script "c:\script\map.bat" and sent via a VAN once every hour.

Other attributes also may be utilized to assist the control of transactions through the transaction gateway. For example, any attribute can be empty ("null"), causing that attribute to default to a more general transaction processing rule. Hence, within a rule hierarchy in accordance with the present invention, a transaction processing rule can define a more specific value for a given attribute without having to provide a value for all attributes.

In view of the foregoing, those skilled in the art will appreciate that, by utilizing a transaction gateway in accordance with the present invention and by defining appropriate transaction processing rules, a business can configure a trading partner network ranging from very simple to very complex. Further, due to the hierarchical arrangement of the processing rules utilized within a preferred form of the invention, only a few transaction processing rules are typically required to manage a sophisticated configuration.

Figure 5A:
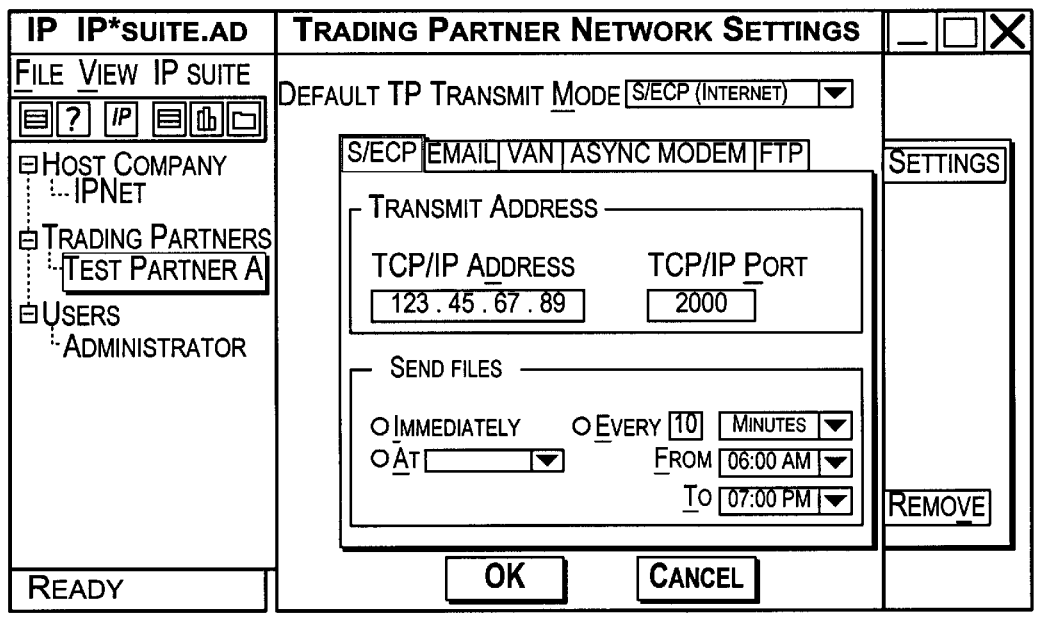
FIGS. 5a and 5b are illustrations of exemplary screens that may be displayed by an application in accordance with a preferred form of the present invention.
Figure 5B:
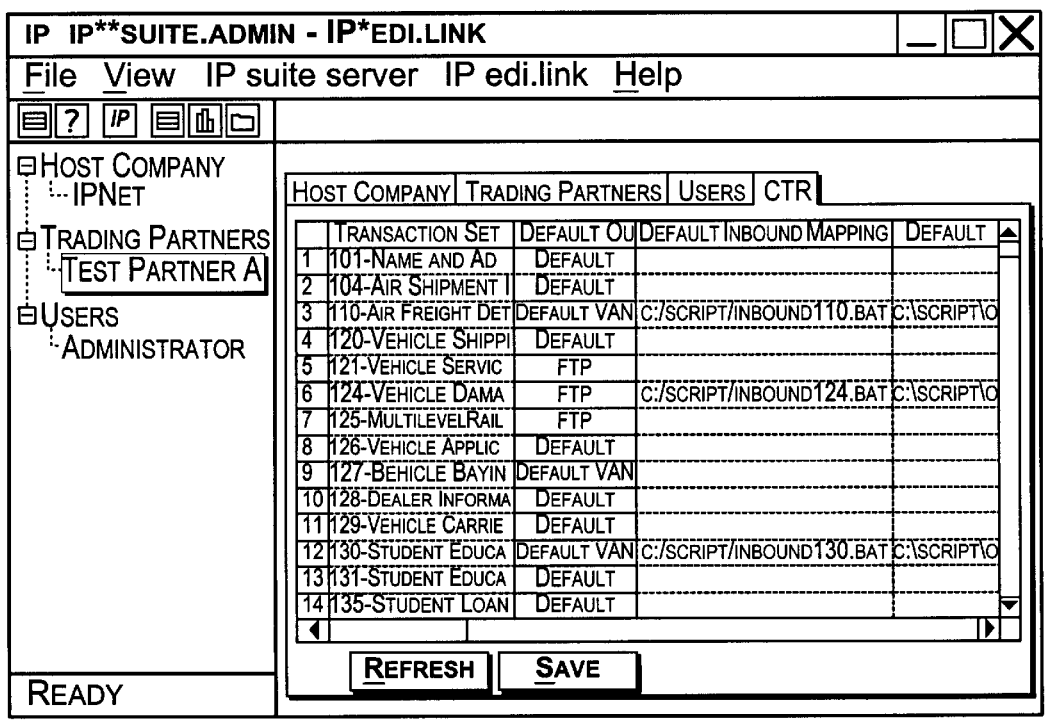

Turning now to the use of a transaction gateway in accordance with the present invention, a transaction gateway generally must be configured with knowledge about its networking environment. Thus, in a preferred form, a transaction gateway or software application in accordance with the present invention will include an application configuration tool for allowing a user, with the aid of a graphic user interface, to define properties of the host company system, the systems of the trading partners of the host company, and the network connections that will be utilized by the host company. For example, if the host company can receive inbound information via email, a system administrator may use the configuration tool to define the email account to be used as the email inbox as well as a default "check mail" frequency. Similarly, if outbound transactions can be sent to a VAN, the administrator may use the application configuration tool to define the VAN connection information (e.g., dial-up number, mailbox ID, and password). If inbound information can be received from the VAN, the administrator may define a default "check mail" frequency as well. Finally, if the host company system supports TCP/IP protocols, the administrator may use the configuration tool to define "address" information for each trading partner that supports the protocol. For example, if a trading partner supports FTP, the administrator may define an appropriate IP address, port number, user ID, password, and directory name. Illustrations of exemplary screens that may comprise portions of a graphic user interface in accordance with the present invention are illustrated in FIGS. 5a and 5b.

The administrator also may use the configuration tool to define transaction processing rules that are to be utilized in effecting electronic data interface (EDI) transactions with the trading partners. Preferably, a set of general transaction processing rules is defined, followed by more specific rules.

When a software application in accordance with the present invention is running, it monitors various data sources for inbound and outbound transactions. For example, the application may monitor directories designated as "inbound" or "outbound" and may analyze any files that appear in these directories. The software application also may monitor VAN and email mailboxes, which typically comprise sources for inbound messages containing transactions. It will be appreciated that a software application in accordance with the present invention can receive a file or message containing many transactions, in which case each transaction is analyzed and routed independently of other transactions. A transaction typically will comprise a single EDI "interchange" or a non-EDI document such as a word processor, spreadsheet, or data file.

For each transaction that it receives from the host system (outbound) or from a trading partner (inbound), a software application in accordance with the present invention preferably will identify three attributes: (1) whether or not the transaction should be passed through a script before it is transmitted to the trading partner (outbound) or host system (inbound); (2) what network mode or electronic data interface network should be used to transmit the transaction: and (3) when the transaction should be transmitted.

To determine these attributes, the application first determines the trading partner to which the transaction will be sent (outbound) or from which it came (inbound), and then determines the type of the transaction. Preferably, the application may then use the trading partner identification and transaction type as a pair to search the transaction processing rule hierarchy for a rule defining how the transaction is to be effected. In a preferred form, specific transaction processing rules are evaluated first, followed by more general rules, until all requisite attributes are satisfied. For example, in one presently preferred form, the application will search for transaction processing rules in the following order:

1) a Transaction processing rule for the specific trading partner and transaction type associated with the transaction;

2) a Transaction processing rule for the specific trading partner and "any" transaction type (i.e., a trading partner default rule);

3) a Transaction processing rule for the host company and the transaction type associated with the transaction; and 4) a Transaction processing rule for the host company and "any" transaction type (i.e., a host company default rule).

If the application finds an applicable transaction processing rule, the application preferably will utilize all attributes of the rule. For example, if the rule specifies a mapping script attribute (which could be "none"), a network mode, and a schedule, no further attributes are required, so no more rules are checked. However, if a transaction processing rule "defers" an attribute to a more general rule, the application will continue searching for a more general rule until that attribute is fulfilled. It will be appreciated that in a preferred form, the transaction processing rule hierarchy uses "global defaults" that can be used to resolve all transactions.

Figure 6:
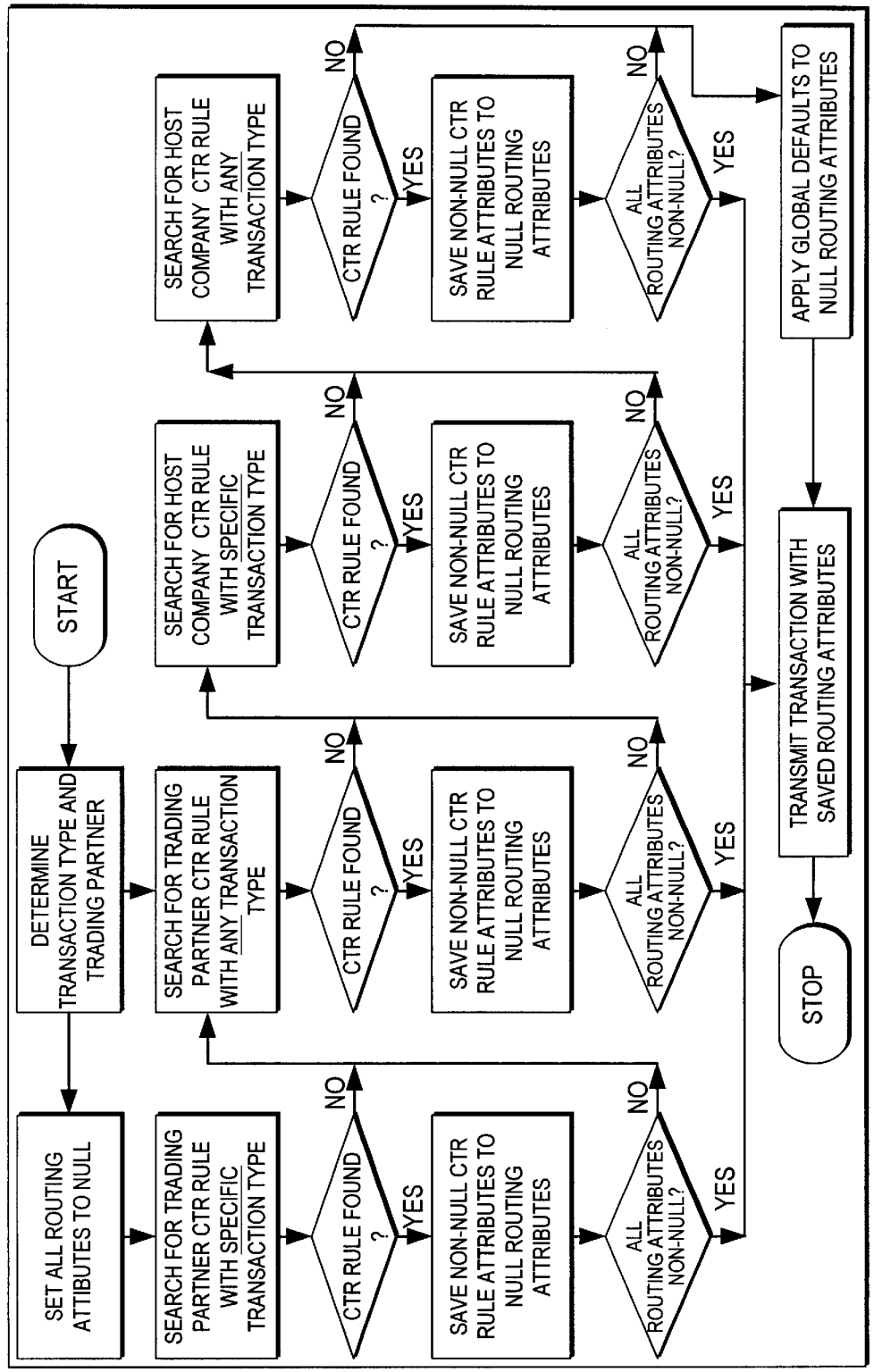
FIG. 6 is a flow chart illustrating a process for selecting transaction processing rules to be followed for a given transaction by a transaction gateway in accordance with a preferred form of the present invention.

A flow chart illustrating exemplary steps that may be followed in selecting a transaction processing rule, or set of rules, for a given transaction is provided in FIG. 6.

It follows that once an application in accordance with the present invention has searched the transaction processing rule hierarchy for a given transaction, the application will have obtained all information necessary to process and route the transaction. If the transaction does not require a script, the transaction is sent to its destination at the scheduled time using the appropriate network mode. If the transaction is processed through a script, the output of the script is transmitted instead of the original transaction. Preferably, transactions are accumulated in a "queue" where they wait until their scheduled transmission time (which could be "immediate").

Figure 7:
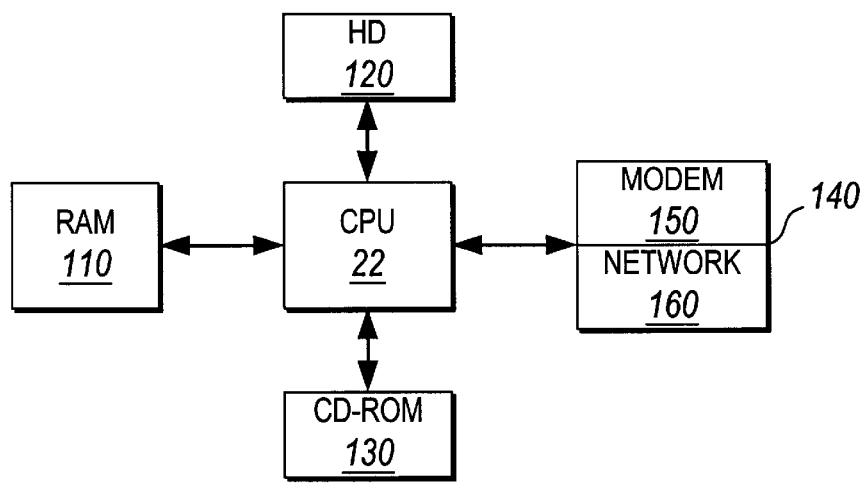
FIG. 7 is a block diagram illustrating the components of a server that functions as an electronic transaction gateway in accordance with one form of the present invention.

Turning now to FIG. 7, an exemplary server 20 that may serve as a transaction gateway in accordance with the present invention preferably comprises an Intel Pentium™ Pro 200, Pentium™ II 200 or comparable microprocessor 22. Pentium™ processors of this type may be obtained, for example, from Intel Corp. of Santa Clara, Calif. The server 20 also preferably comprises 64 megabytes of RAM 110, a 2 gigabyte hard disk drive 120, a 20X CD-ROM drive 130, a network interface 140 including a modem card 150 and a network card 160, and applicable software. The software may operate, for example, on a Windows™ NT network operating system, and Windows™ NT is available from the Microsoft Corporation of Redmond, Washington.

Figure 8:
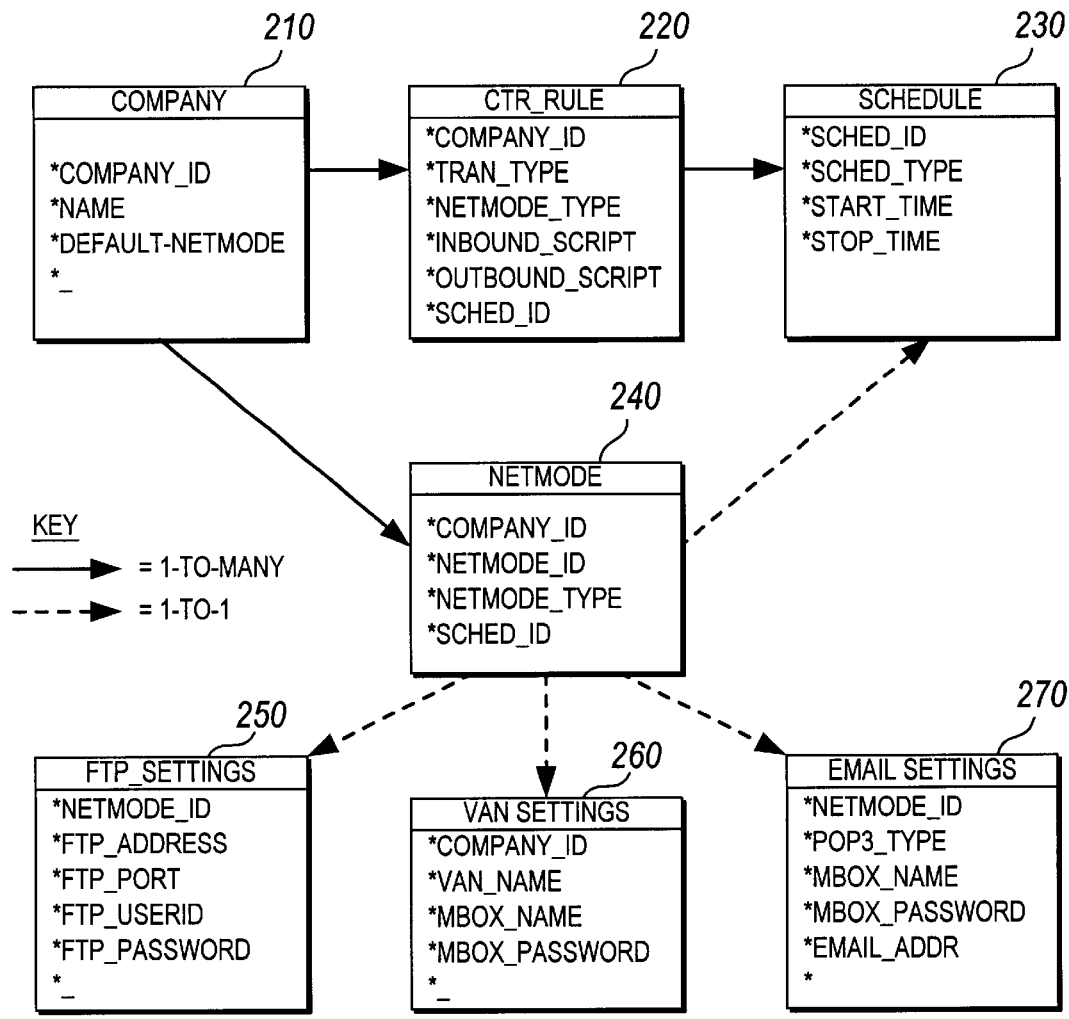
FIG. 8 is an illustration of a database schema that may be utilized by a transaction gateway in accordance with one form of the present invention.

Turning now to FIG. 8, in one preferred form a software application in accordance with the present invention will typically store configuration information including hierarchical transaction processing rules in a database. An exemplary relational database schema that can be used to store configuration information is depicted in FIG. 8. In this example, seven relational tables 210–270 are used, each of which represents a specific type of information. The name of each of the database tables 210–270 is given at the top of the table. Underneath the table name is a list of column names, each of which denotes a value stored for each row within the table. Using standard relational database techniques, the tables 210–270 are logically interconnected using primary key/foreign key techniques. The interconnections establish 1-to-1 or 1-to-many relationships between the tables 210–270, representing the configuration information defined for a specific trading partner community. The purpose of each table and its relationships to other tables are summarized below:

company: Each row within this table represents a company participating in a trading partner community. Each company has a unique identification, denoted by the primary key "company_id". The "name" of each company is also stored within the table, and other company information can be stored as well. By convention, the row representing the host company preferably has a primary key of "1", while all other rows denote trading partner companies. A "default_netmode" value can be assigned to each company, allowing a "global default" network mode to be used whenever no transaction processing rule defines a specific network mode for a given transaction. The default_netmode value corresponds to a "netmode_type" within a related netmode row.

transaction_rule: Each row within this table represents a transaction processing rule. The "company_id" identifies the company row to which each transaction processing_rule row is related, thereby establishing a one-to-many relationship. Consequently, a transaction processing rule whose company_id is "1" is a host company rule, while all others are trading partner rules. The "tran_type" column defines the transaction type to which the transaction processing rule applies. By convention, a tran_type value of "any" designates a general transaction processing rule, while all other values denote a specific transaction rule. The combination of company_id and tran_type form the table's primary key and consequently a unique value pair. The transaction processing rule can specify one or more transaction attributes via other column values: "netmode_type" indicates a network type (e.g., FTP, VAN, or Email); "inbound_script" defines an inbound script name; "outbound_script" defines an outbound script name; "sched_id" is a foreign key to the "schedule" table and therefore defines a schedule. Any transaction attribute column can be null, causing that value to be deferred to a more general rule.

netmode: Each row within this table defines configuration for a specific network mode. The netmode table holds general information common to all network modes such as a foreign key to the company to which the netmode row is related ("company_id"), a unique primary key value ("netmode_id"), the type of network mode represented ("netmode_type"), and a foreign key to the "schedule" table ("sched_id"). If a sched_id value is stored for a specific row, it means that the corresponding network mode has a default schedule as defined by the corresponding schedule row. The schedule can be used as a "global default" when a network mode is determined by a transaction processing rule but no specific or general rule defines a schedule. Every network row is related to one other row in a "settings" table, which defines additional details about the network mode. Consequently, the netmode table has a 1-to-1 relationship with one "settings" table. The complete configuration for a specific network mode is retrieved by "joining" the netmode row with the corresponding row in a "settings" table. Those skilled in the art will appreciate that more "settings" tables are possible than shown in this example to represent other network modes.

ftp_settings: Each row within this table defines additional configuration for the FTP network mode. The "netmode_id" is a foreign key to the netmode table row to which the ftp_settings row is related. Information specific to the FTP protocol is stored such as address, port number, userid, and password information. Additional configuration attributes may also be stored.

VAN_settings: Each row within this table defines additional configuration for a VAN network mode. The "netmode_id" is a foreign key to the netmode table row to which the VAN_settings row is related. Information specific to a specific VAN mailbox is stored such as VAN name, mailbox name, and mailbox password. Other configuration attributes may also be stored.

email_settings: Each row within this table defines additional configuration for the email network mode. The "netmode_id" is a foreign key to the netmode table row to which the email_settings row is related. Information specific to a specific email account is stored such as the email server name ("pop3_name"), mailbox name and password, and email address. Other configuration attributes may also be stored.

schedule: Each row within this table defines the properties of a network schedule. Each schedule row has a unique primary key ("sched_id"), an enumerated schedule type ("sched_type"), and other information that further define the parameters of the schedule ("sched_freq", "start_time", "stop_time"). A specific sched_type value could represent the schedule semantics of "immediately". Another sched_type value could represent a schedule of "once a day" at the given start_time value. Additional sched_type values can be defined to represent other schedule criteria. A schedule row is related either to a transaction processing_rule or a netmode row, and it thereby defines the schedule criteria of that related row.

This database schema allows the host company and trading partner companies to be represented as table rows. Each company row can have one or more netmode rows related to it, each of which, when joined with its related "settings" row, specifies all required parameters of a network mode that the company uses. Each company can also have one or more transaction processing rule rows related to it, each of which defines a general or specific transaction processing rule. The transaction processing rule table can be searched for specific or general rules for either a specific trading partner company or the host company. This allows an application to directly implement the hierarchical searching of transaction processing rules. Transaction processing rules can define transaction attributes, such as network mode and schedule, but the database also allows global defaults to be defined when no transaction processing rule specifies a value for a given attribute.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A computer based electronic transactions gateway comprising:
   a central processing unit having a link to a host system and links to a plurality of electronic data interface networks, such that said central processing unit may establish communications between said host system and selected ones of said electronic data interface networks to effect transactions between said host system and a plurality of trading partner systems, and
   a program executable by said central processing unit, said program comprising a hierarchical set of rules that define how said host system may interact with said plurality of trading partner systems, wherein said rules comprise
      one or more host system default rules applicable to transactions of all types between said host system and said trading partner systems unless a more specific rule applies,
      one or more host system transaction rules applicable to transactions of a specific type between said host system and said plurality of trading partner systems unless a more specific rule applies,
      one or more trading partner default rules applicable to all transactions between said host system and specific trading partner systems unless a more specific rule applies, and
      one or more trading partner transaction rules applicable to specific trading partners and specific transaction types.

2. The computer based electronic transactions gateway of claim 1, wherein said plurality of electronic data interface networks are selected from the group of value added network (VAN) interfaces, facsimile (FAX) interfaces, point-to-point dial-up interfaces, and internet interfaces, and wherein said rules define which electronic data interface network will be selected based upon a document type and recipient identification.

3. The computer based electronic transactions gateway of claim 2, wherein said rules define default electronic data interface network selections for use when no preferred electronic data interface network is identified for a particular combination of document type and recipient identification.

4. The computer based electronic transactions gateway of claim 2, wherein said rules further define schedules for establishing communications links with selected electronic data interface networks.

5. The computer based electronic transactions gateway of claim 1, wherein said rules are dynamically configurable using a graphic user interface depicted on a display coupled to said central processing unit.

6. A network server for managing electronic transactions between a host system and a plurality of trading partner systems, said server comprising:

a central processing unit card having a central processing unit mounted thereon;

a network interface card electronically coupled to said central processing unit card for enabling communications between said central processing unit and one or more processing units comprising said host system; and an electronic data interface card electronically coupled to said central processing unit card for enabling communications between said central processing unit and a plurality of electronic data interface networks such that data may be exchanged between said central processing unit and a plurality of trading partner systems using selected ones of said electronic data interface networks;

wherein said central processing unit operates under control of a program comprising a set of rules that define how said host system may interact with said plurality of trading partner systems by correlating specific trading partner systems, transaction types, and electronic data interface networks, said rules comprising one or more host system default rules applicable to transactions of all types between said host system and said trading partner systems unless a more specific rule applies, one or more host system transaction rules applicable to transactions of a specific type between said host system and said plurality of trading partner systems unless a more specific rule applies, one or more trading partner default rules applicable to all transactions between said host system and specific trading partner systems unless a more specific rule applies, and one or more trading partner transaction rules applicable to specific trading partners and specific transaction types.

7. The network server of claim 6, wherein said plurality of electronic data interface networks comprises at least two networks selected from a group including value added networks, facsimile networks, point-to-point dial-up networks, and internet networks.

8. The network server of claim 7, wherein said rules define which electronic data interface network will be selected based upon a document type and recipient identification.

9. An article of manufacture comprising:

a digital storage medium having stored thereon a program for managing electronic transactions between a host system and a plurality of trading partner systems utilizing a plurality of electronic data interface networks, said program comprising a hierarchical set of rules that defines how said host system may interact with said plurality of trading partner systems, wherein the rules correlate specific trading partner systems, transaction types, and electronic data interface networks, said rules comprising one or more host system default rules applicable to transactions of all types between said host system and said trading partner systems unless a more specific rule applies, one or more host system transaction rules applicable to transactions of a specific type between said host system and said plurality of trading partner systems unless a more specific rule applies, one or more trading partner default rules applicable to all transactions between said host system and specific trading partner systems unless a more specific rule applies, and one or more trading partner transaction rules applicable to specific trading partners and specific transaction types.

10. The article of manufacture of claim 9, wherein said digital storage medium comprises a memory selected from the group of: read only memories (ROMs), random access memories (RAMs), electronically programmable read only memories (EPROMs), electronically erasable programmable read only memories (EEPROMs) and compact disc read only memories (CD ROMs).

11. The article of manufacture of claim 9, wherein said digital storage medium comprises a magnetic storage medium selected from the group of memory diskettes and hard disk drives.

12. The article of manufacture of claim 9, wherein said program further comprises an application configuration tool including graphic user interface software for enabling said hierarchical set of rules to be dynamically defined.

13. A computer based electronic transactions gateway comprising:

a central processing unit having a link to a host system and links to a plurality of electronic data interface networks, such that said central processing unit may establish communications between said host system and selected ones of said electronic data interface networks to effect transactions between said host system and a plurality of trading partner systems using a selected electronic data interface network, and a program executable by said central processing unit, said program comprising a hierarchical set of rules and a plurality of scripts that define how said host system may interact with said plurality of trading partner systems said rules comprising one or more host system default rules applicable to transactions of all types between said host system and said trading partner systems unless a more specific rule applies, one or more host system transaction rules applicable to transactions of a specific type between said host system and said plurality of trading partner systems unless a more specific rule applies, one or more trading partner default rules applicable to all transactions between said host system and specific trading partner systems unless a more specific rule applies, and one or more trading partner transaction rules applicable to specific trading partners and specific transaction types.

14. The computer based electronic transactions gateway of claim 13, wherein said plurality of electronic data interface networks are selected from the group of value added network (VAN) interfaces, facsimile (FAX) interfaces, point-to-point dial-up interfaces, and internet interfaces, and wherein said rules define which of said scripts will be executed and which electronic data interface network will be selected based upon a document type and recipient identification.

15. The computer based electronic transactions gateway of claim 13, wherein the scripts of the program instruct the central processing unit to transform a transaction prior to transmitting that transaction to the host system.

16. The computer based electronic transactions gateway of claim 13, wherein the scripts of the program instruct the central processing unit to transform a transaction prior to transmitting that transaction to a trading partner system.

* * * * *

UNITED STATES PATENT AND TRADEMARK OFFICE
CERTIFICATE OF CORRECTION

PATENT NO. : 6,230,201 B1
DATED : May 8, 2001
INVENTOR(S) : Guck et al.

It is certified that error appears in the above-identified patent and that said Letters Patent is hereby corrected as shown below:

<u>Column 12,</u>
Line 34, please change "systems said" to -- systems, said --.

Signed and Sealed this

Seventh Day of May, 2002

Attest:

Attesting Officer

JAMES E. ROGAN
*Director of the United States Patent and Trademark Office*